United States Patent
Al Kawai et al.

(10) Patent No.: US 11,920,460 B2
(45) Date of Patent: Mar. 5, 2024

(54) IDENTIFYING FORMATION LAYER TOPS WHILE DRILLING A WELLBORE

(71) Applicant: Saudi Arabian Oil Company, Dhahran (SA)

(72) Inventors: Wisam Al Kawai, Al Qatif (SA); Yunlai Yang, Dhahran (SA); Maher I. Almarhoon, Al Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 203 days.

(21) Appl. No.: 17/643,330

(22) Filed: Dec. 8, 2021

(65) Prior Publication Data

US 2023/0175390 A1    Jun. 8, 2023

(51) Int. Cl.
 *E21B 47/04*  (2012.01)
 *E21B 44/02*  (2006.01)
 *E21B 47/013* (2012.01)

(52) U.S. Cl.
 CPC .............. *E21B 47/04* (2013.01); *E21B 44/02* (2013.01); *E21B 47/013* (2020.05)

(58) Field of Classification Search
 CPC ............................. E21B 47/04; E21B 47/107
 See application file for complete search history.

(56) References Cited

U.S. PATENT DOCUMENTS

| | | |
|---|---|---|
| 4,173,898 A | 11/1979 | Forstermann et al. |
| 4,380,930 A | 4/1983 | Podhrasky et al. |
| 4,625,555 A | 12/1986 | Fujii |
| 4,747,303 A * | 5/1988 | Fontenot ............... E21B 49/003 175/45 |

(Continued)

FOREIGN PATENT DOCUMENTS

| | | |
|---|---|---|
| EP | 0117280 | 4/1990 |
| EP | 0294158 | 12/1993 |

(Continued)

OTHER PUBLICATIONS

Corelab.com [online], "Advanced Rock Properties: Acoustic Velocity System, AVMS-350HT," available on or before Jun. 18, 2017, [retrieved on May 22, 2018], retrieved from URL: <http://www.corelab.com/cli/advanced-rock-properties/acoustic-velocity-system>, 2 pages.

(Continued)

*Primary Examiner* — Giovanna Wright

(74) *Attorney, Agent, or Firm* — Fish & Richardson P.C.

(57) ABSTRACT

Some systems and methods for determining depths of subterranean formation layer tops while drilling through the subterranean formation include a drill bit, a drill rig, a microphone, a depth sensor, and a processor. While drilling the through the subterranean formation, the processor receives a measured sound from the microphone and a measured drill bit depth from the depth sensor, normalizes the measured sound across all measured drill bit depths, determines frequency information of the normalized sound for each depth of the plurality of depths, determines frequency spectrums of the normalized sound for one or more depths of the plurality of depths, transforms the frequency spectrums into a depth spectrum, and determines the depths of subterranean formation layer tops based on the depth spectrum.

18 Claims, 8 Drawing Sheets

(56) References Cited

U.S. PATENT DOCUMENTS

| | | |
|---|---|---|
| 5,176,631 A | 1/1993 | Koenig et al. |
| 5,178,005 A | 1/1993 | Peterson |
| 5,243,855 A | 9/1993 | Steiger et al. |
| 5,265,461 A | 11/1993 | Steiger et al. |
| 5,673,697 A | 10/1997 | Bryan et al. |
| 5,678,643 A | 10/1997 | Robbins et al. |
| 5,691,475 A | 11/1997 | Marsala |
| 5,753,812 A | 5/1998 | Aron et al. |
| 5,868,030 A | 2/1999 | Brumley et al. |
| 6,382,332 B1 | 5/2002 | Eaton |
| 6,988,566 B2 | 1/2006 | Lockerd, Sr. et al. |
| 7,289,909 B2 | 10/2007 | Thomamnn et al. |
| 7,404,456 B2 | 7/2008 | Weaver et al. |
| 7,823,451 B2 | 11/2010 | Sarr |
| 9,074,467 B2 | 7/2015 | Yang et al. |
| 9,103,192 B2 | 9/2015 | Yang |
| 9,234,974 B2 | 1/2016 | Yang |
| 9,568,629 B2 | 2/2017 | Almarhoon et al. |
| 9,903,974 B2 | 2/2018 | Yang |
| 10,180,061 B2 | 1/2019 | Yang |
| 10,519,769 B2 | 12/2019 | Havens et al. |
| 10,551,516 B2 | 2/2020 | Yang |
| 10,772,607 B2 | 9/2020 | Guiles |
| 2011/0266058 A1 | 11/2011 | Kumar et al. |
| 2013/0075160 A1 | 3/2013 | Yang |
| 2013/0080060 A1 | 3/2013 | Yang |
| 2013/0080065 A1 | 3/2013 | Yang |
| 2013/0118807 A1 | 5/2013 | Yang |
| 2020/0166662 A1 | 5/2020 | Yang |
| 2021/0389492 A1* | 12/2021 | Yang .................. G01V 1/46 |

FOREIGN PATENT DOCUMENTS

| | | |
|---|---|---|
| EP | 02930507 | 10/2015 |
| WO | WO 03027663 | 4/2003 |
| WO | WO 2013049014 | 4/2013 |
| WO | WO 2013049111 | 4/2013 |
| WO | WO 2013049140 | 4/2013 |
| WO | WO 2016054319 | 4/2016 |

OTHER PUBLICATIONS

Gemmeke and Ruiter, "3D Ultrasound computer tomography for medical imaging," Nuclear Instruments and Methods in Physics Research A, vol. 580, Issue 2, Oct. 1, 2007, 9 pages.

Johnson, "Design and Testing of a Laboratory Ultrasonic Data Acquisition System for Tomography," thesis for degree of Master of Science in Mining and Minerals Engineering, Virginia Polytechnic Institute and State University, Dec. 2, 2004, 108 pages.

Masood et al., "A Critical Review on Estimation of Rock Properties Using Sound Levels Produced during Rotary Drilling"; International Journal of Earth Sciences and Engineering; Dec. 2012, 1809-1814, 6 pages.

Rector III et al., "Radiation Pattern and Seismic Waves Generated by a Working Roller-Cone Drill Bit"; Geophysics; Society of Exploration Geophysicists; vol. 57, No. 10; Oct. 1992, 1319-1333, 15 pages.

Ruiter et al., "3D ultrasound computer tomography of the breast: A new era?" European Journal of Radiology 81S1, Sep. 2012, S133-S134, 11 pages.

Soma et al., "Trial of Coal Seam Imaging by Cross Correlation Analysis of Drilling Noise at Open-Pit Mine Based on Single Point 3C Downhole Observation" Proceedings of the 11th SEGJ International Symposium; Yokohama, Japan; Nov. 18-21, 2013, 302-306, 5 pages.

Zborovjan et al., "Acoustic Identification of Rocks during Drilling Process"; Acta Montanistica Slovaca; Dec. 1, 2003, 191-193, 3 pages.

PCT International Search Report and Written Opinion in International Appln. No. PCT/US2022/052116, dated Mar. 24, 2023, 14 pages.

* cited by examiner

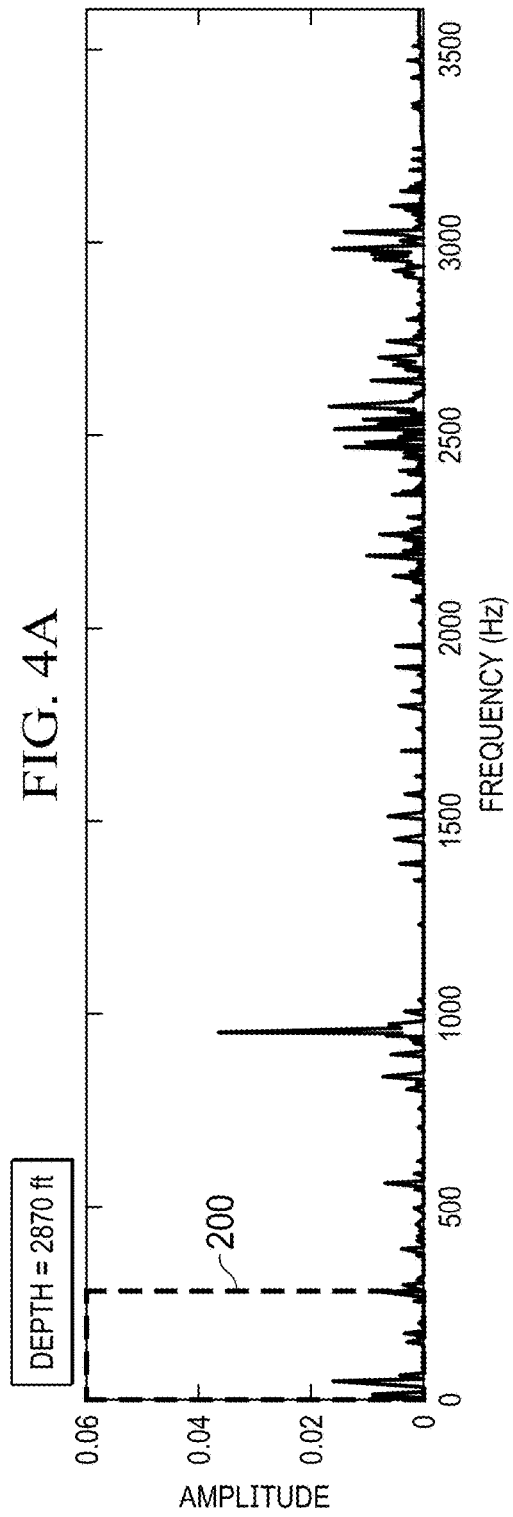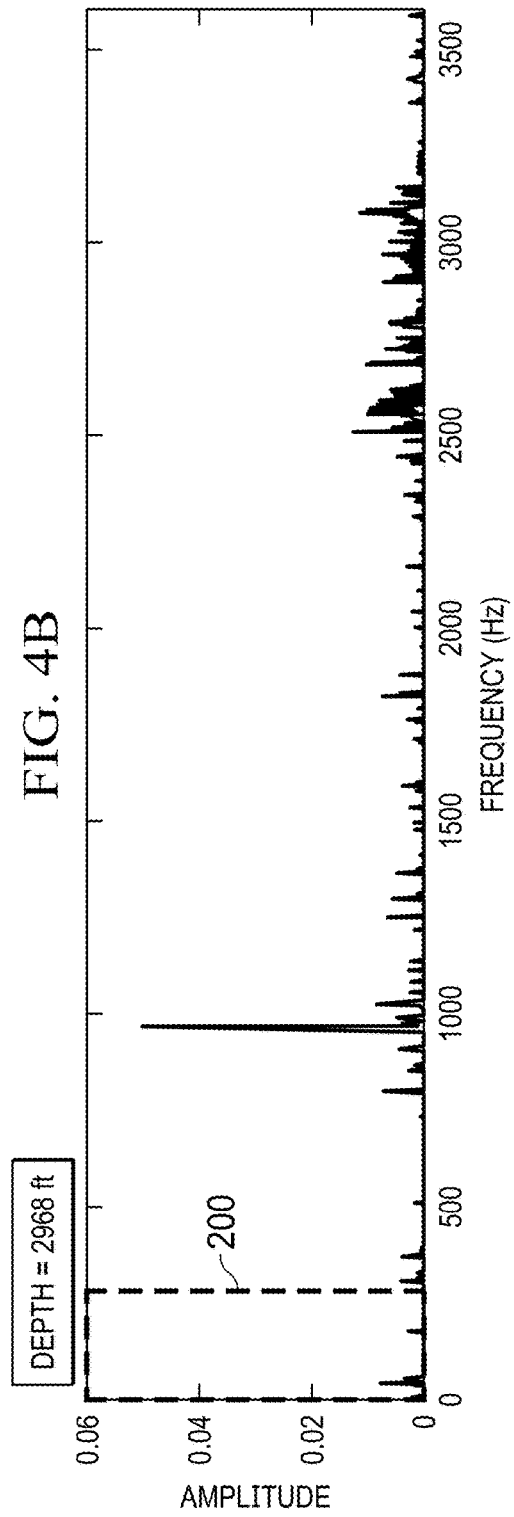

IDENTIFYING FORMATION LAYER TOPS WHILE DRILLING A WELLBORE

TECHNICAL FIELD

This disclosure describes systems and methods for determining subterranean formation layer tops while drilling through a subterranean formation, and more particularly, controlling the drilling of a wellbore in the subterranean formation based on the layer tops determined using acoustic and depth measurements while drilling the wellbore.

BACKGROUND

Oil and gas production typically requires a wellbore to be drilled into a subterranean formation. Subterranean formations consist of various layers of rock with varying mechanical properties (for example, hardness, porosity, and permeability). Knowledge of the precise location of these layers, and in particular, the tops of these layers, is important for successful drilling operations. For example, casings can be installed based on the locations of these layers and drill bits can be changed based on the mechanical properties of the layers. In some examples, subterranean formation layer tops are also referred to as geologic layer tops.

SUMMARY

The systems and methods described in this disclosure relate to determining the depths of subterranean formation layer tops while drilling through the subterranean formation. The systems and methods use a combination of measured sound from within a wellbore and depth of the drill bit while drilling the wellbore. The measured sound is associated with the measured depth to determine depth spectrums representing spectral amplitudes of the sound as a function of depth within the wellbore. The systems and methods use a combination of determining when spectral amplitudes switch from a low value (for example, below a threshold) to a high value (for example, above the threshold) and when the spectral amplitudes maintain the high value for a predetermined depth range to determine the depths of subterranean formation layer tops. The resulting depths are determined in real-time and represent locations of subterranean formation tops within the wellbore as the wellbore is drilled.

Subterranean formations consist of various formation layers each with a respective top and bottom surface. These surfaces undulate within the earth so the depths of these surfaces can vary from wellbore to wellbore even if the wellbores are in close proximity to each other. It is difficult to predict the depth of the tops and bottoms of the formation layers because of this spatial variations within the earth. Well logs, formation maps, and seismic surveys can be used to help estimate the depths of the formation tops but the undulations within the earth cause uncertainties in these estimations.

The systems and methods described in this disclosure determine the depths of the formation layer tops as soon as the drill bit begins to engage a new formation layer. Knowledge of the depths of the formation tops is important when drilling deep into rock that requires a casing. For example, continued drilling without a casing present can lead to well instability. Over-pressured formations are cased to avoid kicks at the well due to high pressure. In some examples, the systems and methods control the drill to stop drilling so that a casing can be installed into the wellbore at the determined depths and drilling can continue. For example, the systems and methods control the drill to stop drilling when the drill is located at a particular formation. In some examples, this process can be applied whether the drill is used during exploration drilling and/or production drilling. Since the measured sound varies based on the formation, the drill can be stopped when a particular formation is reached and which terminates the drilling process.

The systems and methods described in this disclosure use sound measurements from the drill bit as the drill bit drills the wellbore. For example, sound is produced from an interaction between the cutters of the drill bit and subterranean formation as the drill cuts the subterranean formation. This sound is measured by acoustic sensors and processed by a computer. The computer analyzes the frequency content of the acoustic sensors as a function of depth within the wellbore to determine the depths of one of more subterranean formation layer tops. The computer distinguishes frequency characteristics (for example, spectral amplitudes) of the sounds from cutting a first type of rock from the frequency characteristics of sounds produced from cutting a second type of rock to determine the formation layer tops.

Some systems and methods for determining depths of subterranean formation layer tops while drilling through the subterranean formation include a drill bit operable to drill a bore into one or more layers of subterranean formation. The systems and methods include a drill rig that includes one or more drilling motors operable to control the depth and rotation of the drill bit into the subterranean formation. The systems and methods include a microphone attached to the drill bit and operable to measure sound at a plurality of depths while drilling the bore. The systems and methods include a depth sensor operable to measure a drill bit depth at the plurality of depths while drilling the bore. The systems and methods include a processor electrically connected to the microphone and the depth sensor. The processor is operable to perform the operations while drilling. The operations include any and/or all of the operations described in the following paragraph.

The operations include receiving, from the microphone, a sound signal representing sound measured at a plurality of depths within the bore. The operations include receiving, from the depth sensor, a depth signal representing the drill bit depth at the plurality of depths within the bore. The operations include normalizing the measured sound across the plurality of depths based on the sound signal and the depth signal. The operations include determining frequency spectrums of the normalized sound for one or more depths of the plurality of depths. Each frequency spectrum represents spectral amplitude versus frequency. The operations include transforming the frequency spectrums into a single depth spectrum representing the spectral amplitude versus depth for a particular frequency between 100 Hz and 400 Hz. The operations include determining the depths of subterranean formation layer tops based on the depth spectrum.

In some implementations, the operations further include determining a control signal for the one or more drilling motors of drill rig based on the determined one or more depths. In some cases, the operations further include transmitting the control signal to the one or more motors of the drill rig for controlling at least one of the depth and the rotation of the drill bit. In some cases, the operations further include controlling the one or more motors of the drill rig to stop the drilling of the bore based on the control signal.

Some systems and methods further include one or more user interfaces operable to display the frequency spectrums and the depth spectrum, and receive a frequency range selection.

In some implementations, the processor is located in a computer of the drill rig and one or more wires electrically connect the computer to the microphone, to the depth sensor, and to the one or more motors of the drill rig.

In some implementations, the operation of determining the depths of subterranean formation layer tops based on the depth spectrum includes determining the depths associated with spectral amplitudes that change from below a predetermined threshold to above the predetermined threshold as a function of depth. In some cases, the operation of determining the depths of subterranean formation layer tops based on the depth spectrum includes determining the depths associated with spectral amplitudes that continue to maintain spectral amplitudes above the predetermined threshold for a predetermined depth range. In some cases, the predetermined threshold is between 0 and 0.015 and the predetermined depth range is between 10 feet and 100 feet.

Some systems and methods for determining depths of subterranean formation layer tops while drilling through the subterranean formation include drilling, by a drill bit, a bore through one or more layers of the subterranean formation. While drilling the bore, the systems and methods perform any and/or all of the operations described in the following paragraph.

The operations include measuring, by a microphone of the drill bit, a sound at a plurality of depths within the bore. The sound being produced from an interaction of the drill bit and the subterranean formation. The operations include measuring, by a depth sensor of the drill bit, a drill bit depth at the plurality of depths within the bore. The operations include receiving, by a processor, a sound signal representing the measured sound and a depth signal representing the measured drill bit depth. The operations include normalizing, by the processor, the measured sound across the plurality of depths based on the received sound signal and the depth signal. The operations include determining, by the processor, frequency spectrums of the normalized sound for one or more depths of the plurality of depths. Each frequency spectrum represents spectral amplitude versus frequency. The operations include transforming, by the processor, the frequency spectrums into a single depth spectrum representing the spectral amplitude versus depth for a particular frequency between 100 Hz and 400 Hz. The operations include determining, by the processor, the depths of subterranean formation layer tops based on the depth spectrum.

In some implementations, the operation of determining the depths of subterranean formation layer tops based on the depth spectrum includes determining the depths associated with spectral amplitudes changing from below a predetermined threshold to above the predetermined threshold as a function of depth. In some cases, the operation of determining the depths of subterranean formation layer tops based on the depth spectrum includes determining the depths associated with spectral amplitudes continuing to maintain spectral amplitudes above the predetermined threshold for a predetermined depth range. In some cases, the predetermined threshold is between 0 and 0.015 and the predetermined depth range is 100 feet.

In some implementations, the operation of determining the depths of subterranean formation layer tops based on the depth spectrum includes selecting the depths from a user interface.

In some implementations, the operation of determining the depths of subterranean formation layer tops based on the depth spectrum includes comparing the depths with well log data.

In some implementations, the operations further include, while drilling, determining a control signal for one or more motors of a drill rig based on the determined one or more depths and controlling, by the one or more motors of the drill rig, at least one of a depth and a rotation of the drill bit based on the control signal. In some cases, the operation of controlling at least one of the depth and the rotation of the drill bit includes stopping the drilling of the bore. In some cases, the operations further include installing a casing into the bore at the determined one or more depths of the subterranean formation layer tops after stopping the drilling of the bore.

Some systems and methods for determining depths of subterranean formation layer tops while drilling through the subterranean formation include drilling, by a drill bit, a bore through one or more layers of the subterranean formation. The systems and methods further include, while drilling the bore, measuring, by a microphone of the drill bit, a sound at a plurality of depths within the bore. The sound being produced from an interaction of the drill bit and the subterranean formation. The systems and methods further include, while drilling the bore, measuring, by a depth sensor of the drill bit, a drill bit depth at the plurality of depths within the bore. The systems and methods further include, while drilling the bore, receiving, by a processor, a sound signal representing the measured sound and a depth signal representing the measured drill bit depth. The systems and methods further include, while drilling the bore, normalizing, by the processor, the measured sound across the plurality of depths based on the received sound signal and the depth signal. The systems and methods further include, while drilling the bore, determining, by the processor, frequency spectrums of the normalized sound for one or more depths of the plurality of depths. Each of the frequency spectrums represent spectral amplitude versus frequency.

The systems and methods further include, while drilling the bore, displaying, by a user interface, at least two of the frequency spectrums. In response to displaying the at least two frequency spectrums, the systems and methods further include, while drilling the bore, selecting, by the user interface, a first frequency range between 0 Hz and 500 Hz. In response to selecting the first frequency range, the systems and methods further include, while drilling the bore, determining, by the processor, a second frequency range between 200 Hz and 400 Hz.

The systems and methods further include, while drilling the bore, transforming, by the processor, the frequency spectrums into a single depth spectrum representing the spectral amplitude versus depth for a first particular frequency of the second frequency range. The systems and methods further include, while drilling the bore, displaying, by the user interface, the depth spectrum. The systems and methods further include, while drilling the bore, determining, by the processor, the depths of subterranean formation layer tops based on the depth spectrum.

In some implementations, the operation of measuring the sound includes measuring frequencies between 0 Hz and 3500 Hz.

In some implementations, the operation of measuring the drill bit depth at the plurality of depths within the bore includes measuring the drill bit depth at depths between 2000 feet and 4000 feet into the subterranean formation.

In some implementations, determining the depths of subterranean formation layer tops based on the depth spectrum includes comparing the depths with a second depth spectrum generated using a second particular frequency of the second frequency range.

The systems and methods described in this disclosure improve the accuracy of determining subterranean formation layer tops by combining both acoustic and depth information from within the wellbore as the wellbore is drilled. This allows depth spectrums to be generated and used to determine the depths of subterranean formation layer tops. Such an approach is more accurate than using acoustic measurements alone.

The systems and methods described in this disclosure use a combination of threshold detection and depth ranges to determine the depths of subterranean formation layer tops. Such an approach reduces false positives and improves the accuracy of the real-time depth determinations.

The systems and methods described in this disclosure provide real-time control of drilling motors in response to the depth determinations of the subterranean formation layer tops. Real-time control is beneficial in scenarios where the drill bit needs to slow down, speed up, or withdraw from the wellbore based on changes in subterranean formations. For example, this is useful in scenarios where a casing needs to be installed, or a drill bit needs to be changed, based on changes in subterranean formation layers.

The systems and methods described in this disclosure allow engineers to interact with the depth determination using one or more user interfaces. This improves accuracy of the depth determination and confidence of the engineer by allowing engineers to manually select frequency ranges and confirm depths of formation layer tops based on depth spectrum and spectrogram plots.

The systems and methods described in this disclosure are preferentially based on analyzing frequency information within a 0 Hz to 500 Hz frequency range. This frequency range revealed spectral changes as a function of depth in one or more experiments performed to date. In some examples, a subset of this frequency range is used for depth detection (for example, 150 Hz to 300 Hz) because this frequency range also revealed subterranean formation layer tops based on one or more experiments performed to date.

The details of one or more embodiments of these systems and methods are set forth in the accompanying drawings and the description below. Other features, objects, and advantages of these systems and methods will be apparent from the description and drawings, and from the claims.

DESCRIPTION OF DRAWINGS

FIGS. 4A-4D are frequency spectrum plots of measured sound within a wellbore for depths of 2870 feet, 2968 feet, 3303 feet, and 3484 feet, respectively.

Like reference symbols in the various drawings indicate like elements.

DETAILED DESCRIPTION

The systems and methods described in this disclosure relate to determining the depths of subterranean formation layer tops while drilling through the subterranean formation. The systems and methods use a combination of measured sound from within a wellbore and depth of the drill bit while drilling the wellbore. The measured sound is associated with the measured depth to determine depth spectrums representing spectral amplitudes of the sound as a function of depth within the wellbore. The systems and methods use a combination of determining when spectral amplitudes switch from a low value (for example, below a threshold) to a high value (for example, above the threshold) and when the spectral amplitudes maintain the high value for a predetermined depth range to determine the depths of subterranean formation layer tops. The resulting depths are determined in real-time and represent locations of subterranean formation tops within the wellbore as the wellbore is drilled.

Figures 1A, 1B:
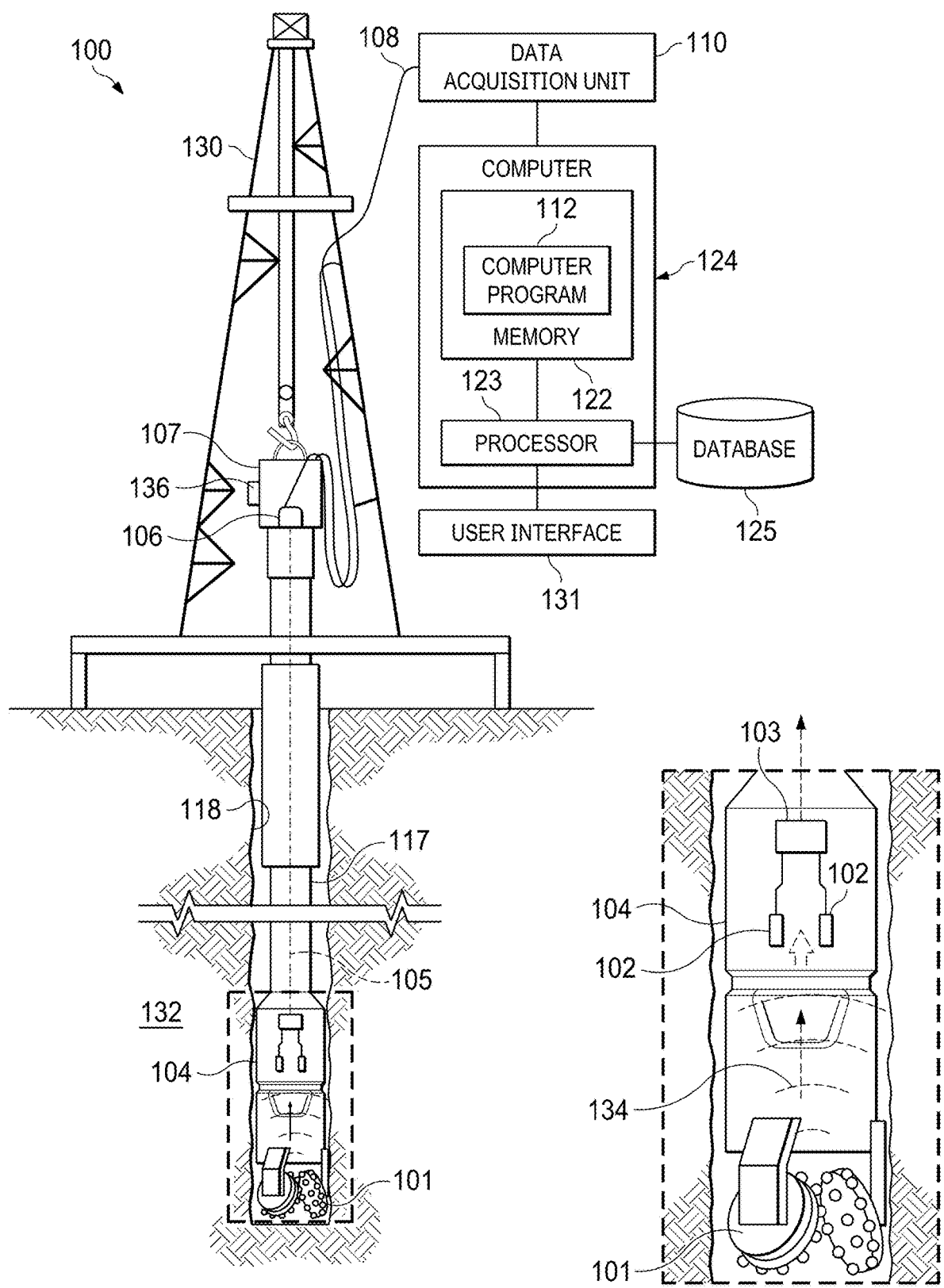
FIG. 1A is a schematic side view of an example wellbore system.
FIG. 1B is an enlarged side view of a drill bit for forming a wellbore.

FIG. 1A is a schematic side view of an example wellbore system 100. The wellbore system includes a drill rig 130 with a drilling motor 107 mechanically attached to the drill rig 130. The drilling motor 107 is operable to control the depth and rotation of a drill bit 104 into a subterranean formation 132. The drill bit 104 is attached to a drill stem 117 and the drilling motor 107 controls the depth and rotation of the drill bit 104 by rotating and translating the drill stem 117. The drill bit 104 includes one or more cutters 101 for engaging and cutting the subterranean formation 132 to form a wellbore 118. In some examples, the drill string 117 has a length between 2000 feet and 4000 feet for forming a wellbore 118 having a depth between 2000 feet and 4000 feet.

The wellbore system 100 includes a computer 124 electrically connected to the drilling motor 107 using a communication and power cable 108. The communication and power cable 108 includes one or more electrical wires. The computer 124 determines control signals for controlling the drilling motor 107. For example, the computer 124 determines a rotational velocity (for example, 1000 revolutions per minute) and a translational rate (for example, 1 foot per minute) of the drilling motor 107 and sends a control signal to the drilling motor 107 to cause the drilling motor 107 to rotate at the rotational velocity and translate into the subterranean formation 132 at the translational rate.

The computer 124 is connected to a database 125 for storing data associated with the control of the wellbore system 100. The computer 124 is connected to a data acquisition unit 110 for converting analog measurements from the wellbore system 100 into digital representations for the computer 124. The computer 124 includes a user interface 131 (for example, a touch screen display) operable to present information to an engineer and receive input and selections from the engineer. For example, the user interface 131 is operable to display the frequency spectrums and depth spectrums based on measurements from one or more acoustic sensors 102 and receive a frequency range selection. The computer 124 includes a processor 123 and memory 122 storing computer programs 112 for carrying out one or more operations of the wellbore system 100. For example, the computer 124 determines depth locations of subterranean formation layer tops and controls the drilling motor 107 in response to such depth determinations. Aspects related to determining depth locations of subterranean formation layer tops is described with reference to FIGS. 2-4D. Additional aspects of the computer 124 is described with reference to the computer 280 of FIG. 7.

The wellbore system 100 includes a depth sensor 136 attached to the drilling motor 107. The depth sensor measures a translational position of the drill stem 117. The computer 124 is electrically connected to the depth sensor 136 and receives measured depth information from the depth sensor 136. The computer 124 determines a depth of the drill bit 104 based on the measured depth information from the depth sensor 136.

FIG. 1B is an enlarged side view of the drill bit 104. The drill bit 104 includes one or more acoustic sensors 102 electrically connected to a downhole data interface 103. The acoustic sensors 102 measure sound 134 (or structural vibration) generated by an engagement of the cutters 101 with the subterranean formation 132 as the cutters 101 cut the subterranean formation 132. For example, the sound 134 is generated when the cutters 101 bite and crush the rock at the bottom of the wellbore 118.

The acoustic sensors 102 measure sound and/or vibration at the same time as the drill bit 104 (using the cutters 101) cuts the subterranean formation 132. For example, the acoustic sensors 102 measure sound and/or vibration in real-time as the wellbore 118 is drilled.

In some examples, the acoustic sensors 102 are microphones operable to measure 0 Hz to 4 kHz sound. In some examples, the microphones are measurement microphones, contact microphones, and/or hydrophones. In some examples, the acoustic sensors 102 are accelerometers operable to measure 0 Hz to 4 kHz structural vibrations. In some examples, the accelerometers measure structural vibration (for example, pressure and/or shear waves) propagating through the drill bit 104. In some examples, the drill bit 104 includes both microphones and accelerometers and sound and structural vibrations are measured simultaneously or sequentially.

The downhole data interface 103 is electrically connected to a surface data interface 106 using a communication cable 105. The communication cable 105 includes one or more electrical wires. The communication cable 105 is located in a central bore of the drill stem 117. In some examples, the communication cable 105 is decoupled from rotation using a slip ring (not shown). The surface data interface 106 is electrically connected to the data acquisition unit 110 for transmitting the measured sound and/or vibration information to the computer 124. Importantly, the measured sound and/or vibration is transmitted to the computer 124 at the same time as the drill bit 104 (using the cutters 101) cuts the subterranean formation 132. For example, the measured sound and/or vibration is transmitted to the computer 124 in real-time as the wellbore 118 is drilled.

While described with reference to a physical cable 105, in some examples, the downhole data interface 103 is electrically connected to the surface data interface 106 using a wireless protocol (for example, frequency modulation, amplitude modulation, Wi-Fi, etc.) without a physical cable.

In some examples, the surface data interface 106 is mechanically attached to the drilling motor 107. In some examples, each acoustic sensor 102 either has a built-in amplifier or is connected directly to an amplifier (not shown) for amplifying the measured sound information before transmitting the measured sound information to the computer 124 via the communication cable 105. In some examples, the downhole data interface 103, the surface data interface 106, and the communication cable 105 are part of a NOV™ IntelliServ® broadband data transmission system capable of the measured sound and/or vibration information at a rate of 1000,000 bit/s.

Figure 2:
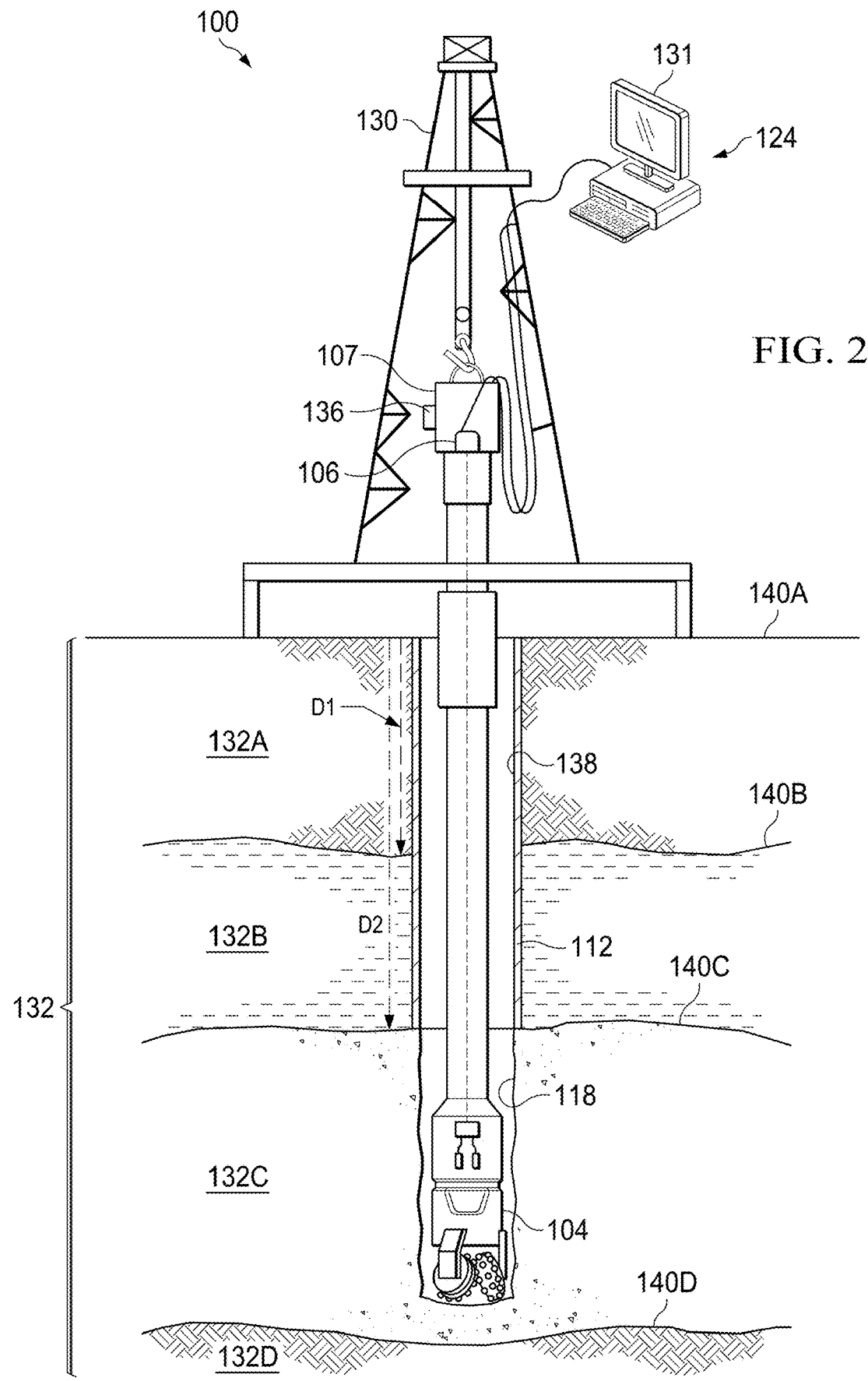
FIG. 2 is a schematic side view of subterranean formation layer tops.

FIG. 2 is a schematic side view of the wellbore system 100. As described with reference to FIG. 1A, the computer 124 controls the drilling motor 107 to cause the cutters 101 of the drill bit 104 to cut through the subterranean formation 132. The subterranean formation 132 includes multiple formation layers 132A-132D. Each formation layer includes different rock with different geo-mechanical properties. For example, each layer typically has different porosity, shear modulus, bulk modulus, hardness, density, and permeability properties. Examples of formation layers include mudstone, siltstone, limestone, and sandstone.

During the drilling process, a casing 138 is used to support the wellbore 118. The casing 138 is affixed to the subterranean formation 132 using cement. The casing 138 is a tubular pipe constructed out of steel. Since each of the formations layers 132A-132D can have different geo-mechanical properties, varying stresses are applied to the casing 138 by the subterranean formations 132 as a function of depth in the wellbore 118.

In some examples, more than one casing is installed in the wellbore 118. For example, a different casing can be installed for each formation layer. In some examples, an engineer determines a depth to install the casing 138 based on the properties of one or more of the formation layers 132A-132D. In the example wellbore system 100 shown in FIG. 2, the casing 138 is installed to span the first two formation layers 132A-132B.

As shown in FIG. 2, each formation layer has a top surface and a bottom surface. For example, formation layer 132A has a top surface 140A and a bottom surface 140B. In this example, the top surface 140A is also a ground surface. The wellbore system 100 determines the depths of the formation layer tops as soon as the drill bit begins to engage a new formation layer.

Formation layer 132B has a top surface 140B located at a depth D1 into the wellbore 118 and formation layer 132C has a top surface 140C located at a depth D2 into the wellbore 118. The wellbore system 100 determines depths D1 and D2 and other depths associated with additional formation layers as the drill bit 104 drills into the subterranean formation 132 to form the wellbore 118.

Figure 3:
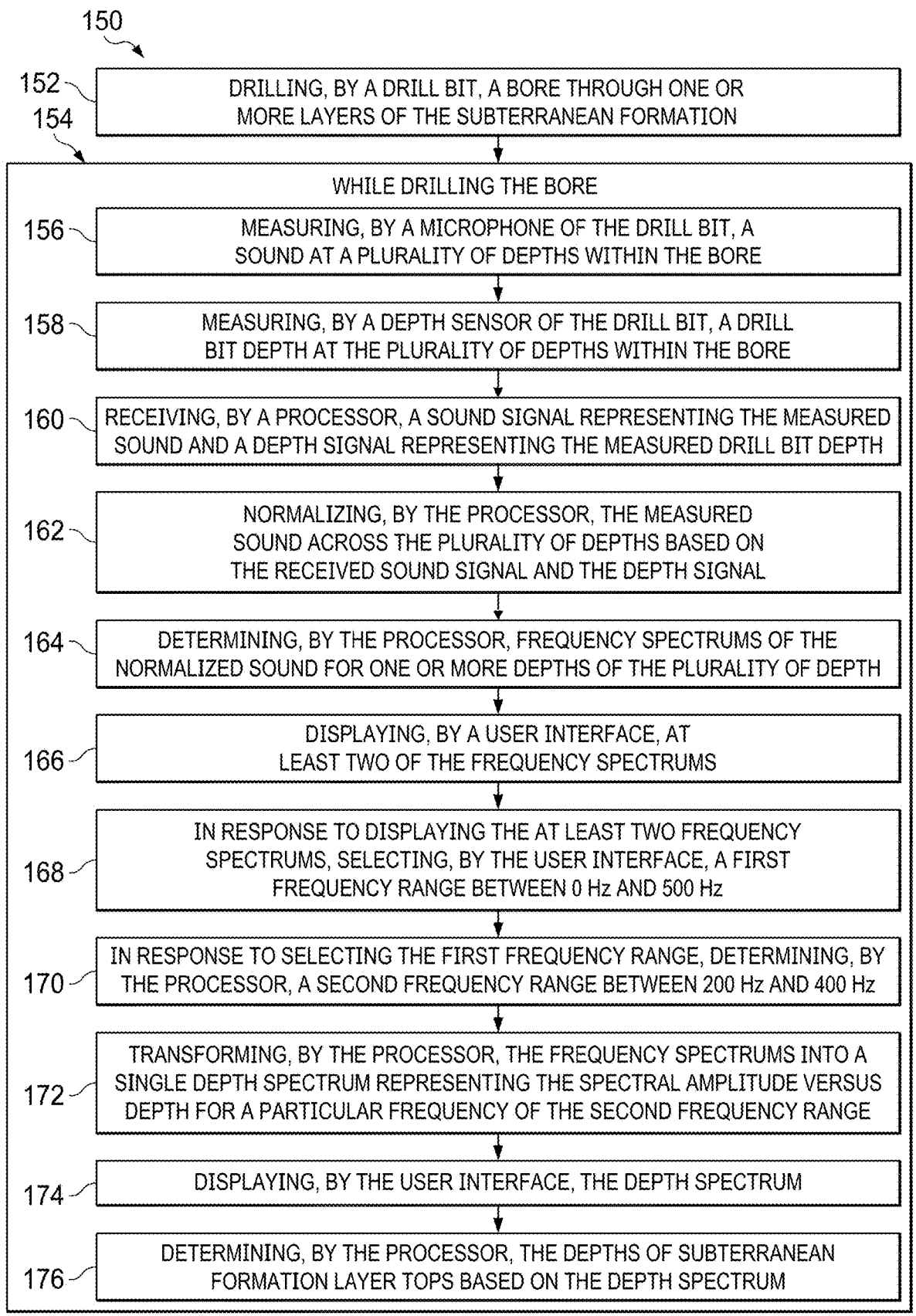
FIG. 3 is a method for determining depths of subterranean formation layer tops while drilling through the subterranean formation.

FIG. 3 is a method 150 for determining depths of subterranean formation layer tops while drilling through the subterranean formation. In some examples, the computer 124 (and more specifically, the processor 123) of the wellbore system 100 performs one or more steps of the method 300. In some examples, the drill motor 107, the drill bit 104, the acoustic sensors 102, the depth sensor 136, the user interface 131, and/or an engineer performs one or more steps of the method 150.

At step 152, a drill bit drills a bore through one or more layers of the subterranean formation. For example, the drill bit 104 drills through one or more layers 134A-134D of the subterranean formation 132. In some examples, the computer 124 controls the drilling motor 107 to rotate and translate the drill bit 104 through one or more layers 134A-134D of the subterranean formation 132.

At step 154, the following steps are performed while drilling the bore. In some examples, the following steps are performed in real-time while the drill bit 104 drills through one or more layers 134A-134D of the subterranean formation 132. In some examples, steps 156, 158, 160, 162, 164, 166, 168, 170, 172, 174, and 176 are performed in real-time while the drill bit 104 drills through one or more layers 134A-134D of the subterranean formation 132.

At step 156, a microphone of the drill bit measures a sound at a plurality of depths within the bore. For example, the acoustic sensors 102 of the drill bit 104 are microphones and measure a sound as the drill bit 104 descends through the subterranean formation 132. In some examples, the acoustic sensors 102 continuously measure sound as the drill bit 104 descends through the subterranean formation 132 in real-time. In some examples, the acoustic sensors 102 measure sound at particular increments into the bore. For example, the acoustic sensors 102 measure sound at 6 inch (15 centimeter) depth increments into the bore. In some cases, the acoustic sensors 102 measure sound at 1 foot (30 centimeter) depth increments into the bore.

In general, the sound is produced from an interaction of the drill bit 104 and the subterranean formation 132 as the cutters 101 cut through the subterranean formation 132. In some examples, 0 Hz to 4 kHz sound is measured by the acoustic sensors 102 as part of step 156. In some examples, 0 Hz to 3.5 kHz sound is measured by the acoustic sensors 102 as part of step 156.

At step 158, a depth sensor of the drill bit measures a drill bit depth at the plurality of depths within the bore. For example, the depth sensor 136 of the wellbore system 100 measures a depth of the drill bit 104 as the drill bit 104 descends through the subterranean formation 132. In some examples, the depth sensor 136 continuously measures the depth of the drill bit 104 as the drill bit 104 descends through the subterranean formation 132 in real-time. In some examples, the depth sensor 136 continuously measures the depth of the drill bit 104 while the drill bit 104 is descending between from the ground surface to depths of 4000 feet into the subterranean formation 132. In some examples, the depth sensor 136 continuously measures the depth of the drill bit 104 while the drill bit 104 is descending between 2000 feet to 4000 feet into the subterranean formation 132.

At step 160, a processor receives a sound signal representing the measured sound and a depth signal representing the measured drill bit depth. For example, data acquisition unit 110 receives both a sound signal representing the measured sound and a depth signal representing the measured drill bit depth via the communications cable 105 and the communication and power cable 108. The computer 124 receives respective signals representing the measured sound and the measured drill bit depth from the data acquisition unit 110.

In some examples, the processor associates the measured sound information with the measured drill depth information. For example, if the measured sound was continuously measured for an hour and the drill bit information indicates that the drill bit descended at a constant rate of one foot per minute during that same time, then the computer 124 determines that each minute of the measured sound signal is associated with a one foot decent into the subterranean formation 132. If the drill bit started measuring sound at the ground surface, then the depth at the one hour mark is 60 feet and sound measurements taken 30 minutes into the decent are associated with a drill bit depth of 30 feet.

At step 162, the processor normalizes the measured sound across the plurality of depths based on the received sound signal and the depth signal. For example, the computer 124 normalizes the measured sound such that the amplitudes for all measured sounds for all measured depths varies within a range of 0 and 1. Normalization helps to avoid interpretation biases. For example, the interpretation of the formation tops is based on the pattern of the measured sound. The normalization of amplitude values between 0 and 1 emphasizes the pattern of the measured sound based on interpretation and avoiding any biases caused by focusing on the particular numerical values of amplitude.

At step 164, the processor determines frequency spectrums of the normalized sound for one or more depths of the plurality of depth. For example, the computer 124 transforms the normalized time domain sound measurements into a frequency spectrum in a frequency domain by performing a fast Fourier transformation (FFT) on the normalized time domain sound measurements. In some examples, the frequency spectrum represents spectral amplitude versus frequency. In some examples, the frequency spectrum is determined for a range of frequencies between 0 Hz and 4 kHz.

At step 164, a user interface displays at least two of the frequency spectrums. For example, the computer 124 displays at least two of the frequency spectrums on the user interface 131 of the computer 124.

FIGS. 4A-4D are plots of frequency spectrums of the measured sound at various depths into the subterranean formation 132. These figures represent randomly selected depths into the bore to illustrate that the preferable frequency range is generally depth sensitive (for example, representative of the changes of the geology in the subterranean formation rather than being dominated by noise).

Figure 4C:
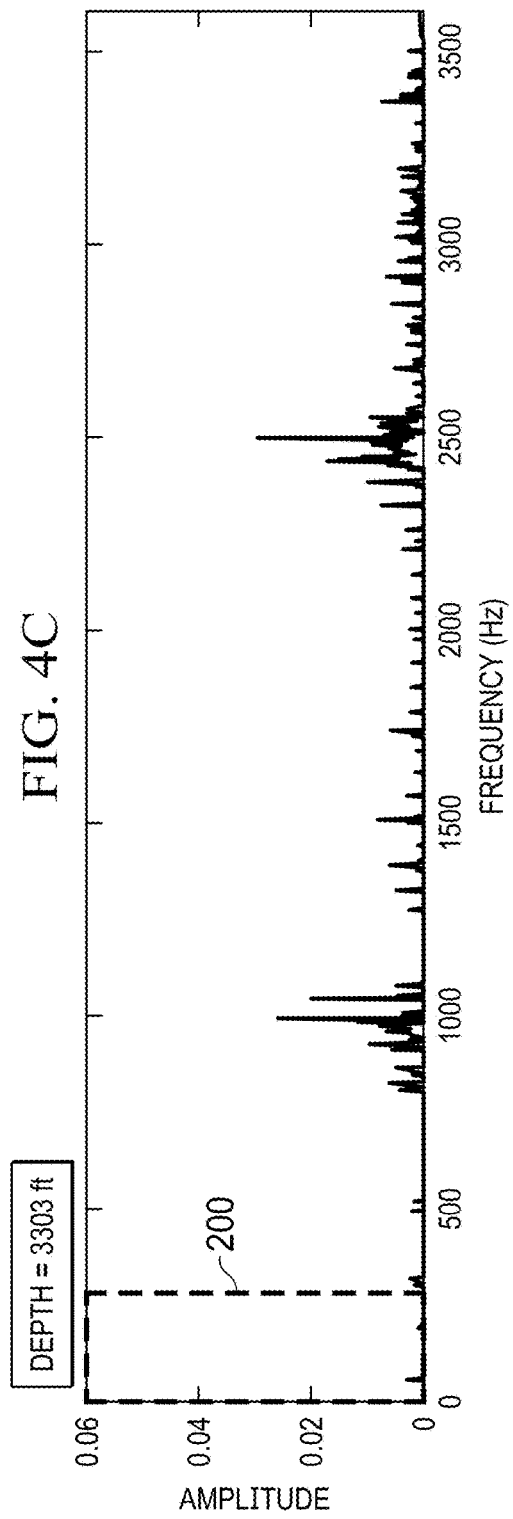
Figure 4D:
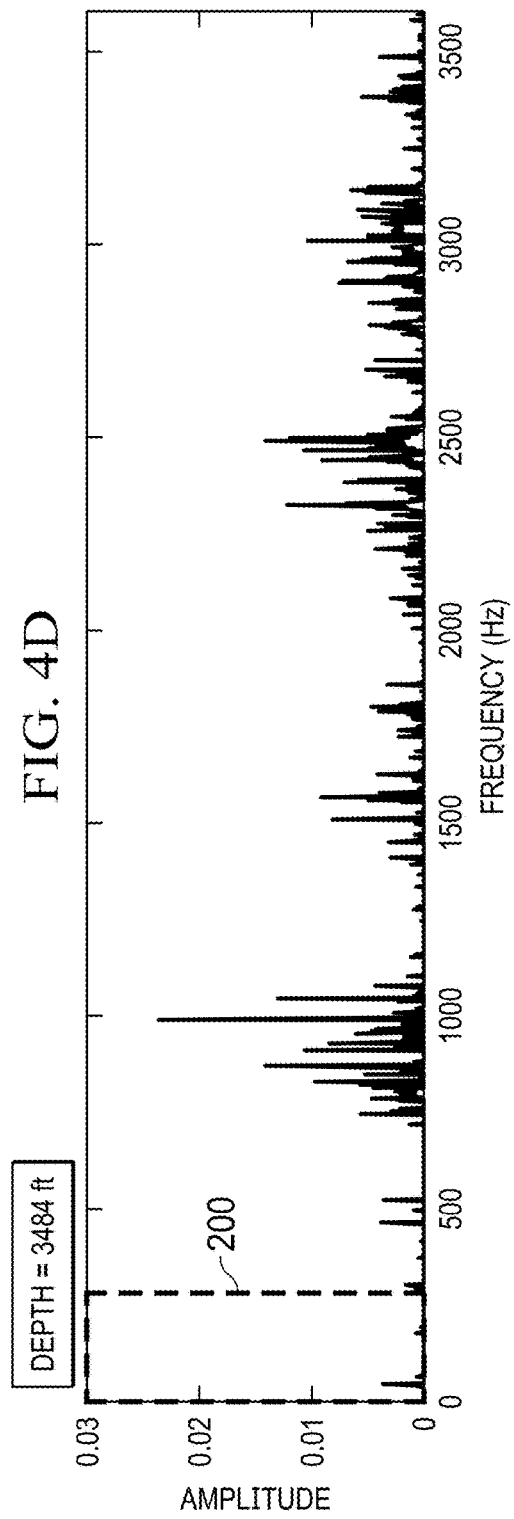

The computer 124 displays at least two of the frequency spectrums shown in FIGS. 4A-4D on the user interface 131 of the computer 124 as part of step 164. FIG. 4A is a plot of frequency information for a drill bit depth of 2870 feet into the subterranean formation 132. FIG. 4B is a plot of frequency information for a drill bit depth of 2968 feet into the subterranean formation 132. FIG. 4C is a plot of frequency information for a drill bit depth of 3303 feet into the subterranean formation 132. FIG. 4D is a plot of frequency information for a drill bit depth of 3484 feet into the subterranean formation 132.

In some examples, the computer 124 randomly selects the particular depths to display on the user interface 131 as part of step 166. For example, the computer 124 randomly selects four depths of 2870 feet, 2968 feet, 3303 feet, and 3484 feet and displays the frequency spectrums measured at these depths to an engineer using the user interface 131.

At step 168, in response to displaying the at least two frequency spectrums, a user selects, by the user interface, a first frequency range between 0 Hz and 500 Hz. For example, the user interface 131 displays at least two of the frequency spectrums shown in FIGS. 4A-4D and, in response, the engineer selects (or inputs) a first frequency range 200 using the user interface 131. In some examples, the first frequency range corresponds to a frequency range where spectral amplitudes (for example, the amplitudes shown in FIGS. 4A-4D) vary from depth-to-depth. For example, drilling through different formation layers causes different sounds (and different frequency content) to be measured by the acoustic sensors 102. In some examples, the engineer selects the first frequency range to be 0 Hz to 300 Hz.

In some examples, the computer 124 automatically determines the first frequency range instead of the engineer selecting the first frequency range using the user interface 131. For example, the computer 124 automatically determines the first frequency range to be a predetermined preferable frequency range (for example, 0 Hz to 300 Hz) that represents geologic changes rather than noise. In this example, the computer 124 automatically selects the first frequency range to be 0 Hz to 300 Hz for all depths. In some examples, the computer 124 determines the first frequency range based on spectral amplitude changes as a function of depth.

In some examples, the computer 134 automatically determines the first frequency range and allows an engineer the ability to update to determined first frequency range using the user interface 131.

At step 170, in response to selecting the first frequency range, the processor determines a second frequency range between 200 Hz and 400 Hz. For example, the computer 124 automatically determines the second frequency range based on the first frequency range. In some examples, the computer 124 automatically the second frequency to be an upper half of the first frequency range. For example, if the first frequency range is 0 Hz to 300 Hz, the second frequency range is determined to be 150 Hz to 300 Hz. In some examples, the computer 124 automatically the second frequency to be an upper third of the first frequency range. For example, if the first frequency range is 0 Hz to 300 Hz, the second frequency range is determined to be 200 Hz to 300 Hz. In some examples, the computer 124 automatically the second frequency to be an upper fourth of the first frequency range. For example, if the first frequency range is 0 Hz to 300 Hz, the second frequency range is determined to be 225 Hz to 300 Hz. In some examples, the computer 124 automatically the second frequency to be the upper-most 50 Hz of the first frequency range. For example, if the first frequency range is 0 Hz to 300 Hz, the second frequency range is determined to be 250 Hz to 300 Hz.

At step 172, the processor transforms the frequency spectrums into a single depth spectrum representing the spectral amplitude versus depth for a particular frequency of the second frequency range. For example, the computer 124 transforms the frequency spectrums into a single depth spectrum. For example, if the second frequency range is 250 Hz to 300 Hz, the computer 124 transforms the frequency spectrums into a single depth spectrum representing the spectral amplitude versus depth for 275 Hz. In some examples, the computer 124 generates depth spectrums for other frequencies of the second frequency range. For example, if the second frequency range is 250 Hz to 300 Hz, the computer 124 transforms the frequency spectrums into three separate depth spectrums representing the spectral amplitude versus depth for 250 Hz, 275 Hz, and 300 Hz, respectively.

In some examples, the computer 124 transforms the frequency spectrums into the depth spectrums using the approach described in this paragraph. The computer 124 associates the spectral amplitude of the frequency spectrums (from step 164) with the measured depth information. In some cases, this association results in a 3D visualization of spectral amplitude versus frequency versus depth. For each particular frequency of the second frequency range (for example, 250 Hz, 275 Hz, and 300 Hz), the computer 124 generates a 2D "slice" through the spectral amplitude versus depth information to generate the depth spectrum. An example depth spectrum is shown in FIG. 5.

Figure 5:
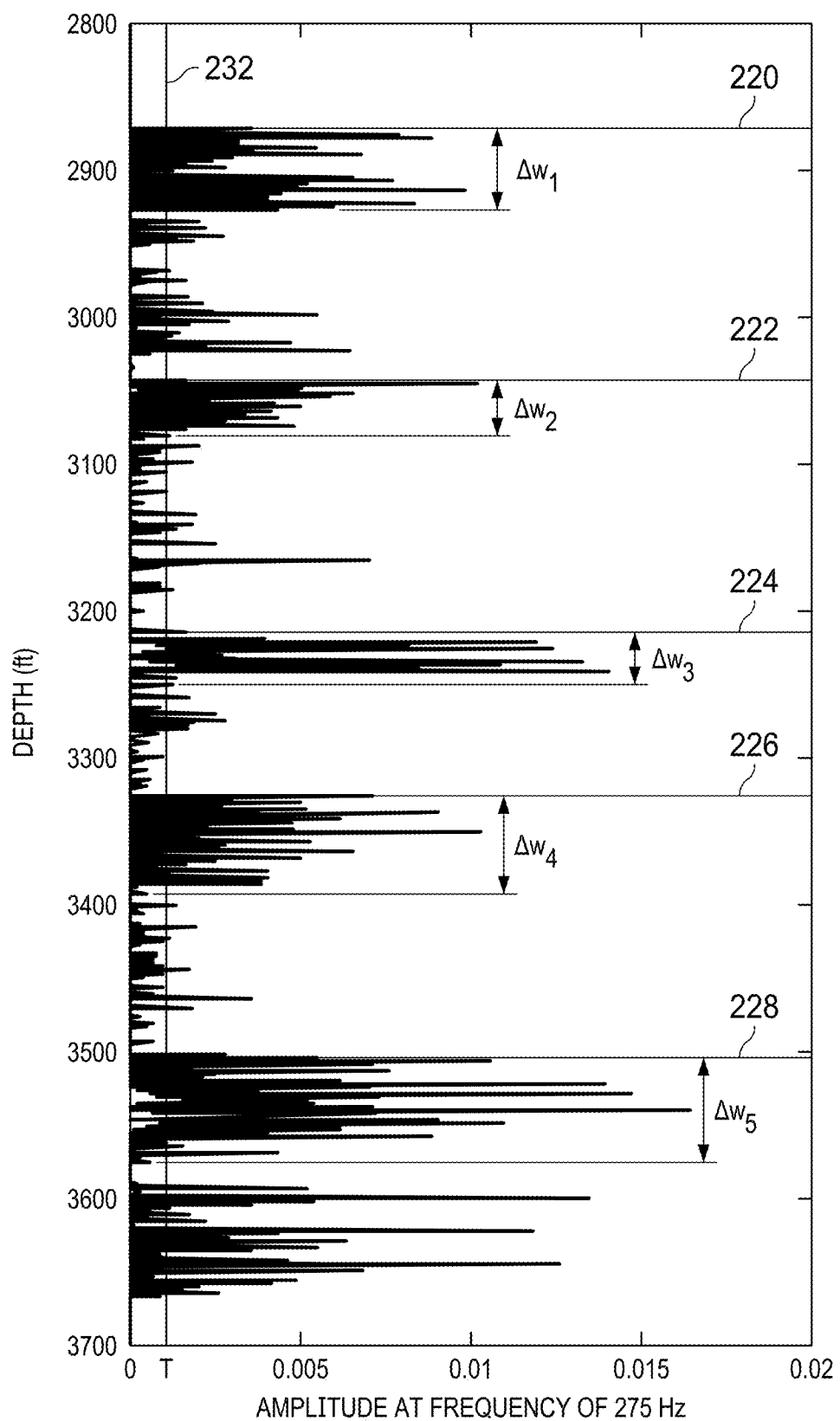
FIG. 5 is a depth spectrum plot of measured sound within a wellbore at 275 Hz.

FIG. 5 is a depth spectrum of measured sound within a wellbore at 275 Hz. In FIG. 5, the y-axis of FIG. 5 represents the drill bit depth into the subterranean formation 132 (depths of 2800 feet to 3700 feet are shown) and the x-axis represents the spectral amplitude for all measured depths (the spectral amplitude varies between 0 and 0.02 in this example). The depth spectrum essentially visualizes how sound changes as a function of depth within the wellbore 118. Aspects relating to how the computer 124 uses the depth spectrum to determine subterranean formation layer tops is described with reference to step 176.

At step 174, the depth spectrum is displayed on the user interface. For example, the user interface 131 displays the depth spectrum shown in FIG. 5. In some examples, the user interface 131 displaces each depth spectrum determined. For example, if depth spectrums are generated for 250 Hz, 275 Hz, and 300 Hz, each of these three depth spectrums are displayed on the user interface 131 ether together or in succession.

At step 176, the processor determines the depths of subterranean formation layer tops based on the depth spectrum. For example, the computer 124 analyzes the depth spectrum to determine the depths of the subterranean formation layer tops. Since the depth spectrum is generated (for example, in real-time) by the computer 124 as the wellbore 118 is formed, the depth spectrum may or may not have subterranean formation layer tops present when generated. As the drill bit 104 passes through a subterranean formation layer top, the spectral amplitudes change (for example, vary with depth) and this change is detected by the computer 124.

In some examples, the processor determines the depths of subterranean formation layer tops based on (i) spectral amplitudes changing from below a predetermined threshold to above the predetermined threshold as a function of depth and (ii) continuing to maintain spectral amplitudes above the predetermined threshold for a predetermined depth range.

For example, the computer 124 determines all depths that are associated with spectral amplitudes that change from below a predetermined threshold (T) to above the threshold (T) as a function of depth. In some examples, the threshold (T) is 0.0005 which is represented in FIG. 5 using line 232. The computer 124 removes false positives by combining with maintaining the threshold through a predetermined depth range.

For example, the computer 124 determines which of the depths identified in the above paragraph continue to maintain spectral amplitudes above the threshold for a predetermined depth range. In some examples, with the threshold (T) and a predetermined depth range of 100 feet, the computer 124 identifies all depths associated with spectral amplitudes changing from below the threshold (T) to above the threshold (T) as a function of depth and spectral amplitudes that continue to maintain the spectral amplitudes above the threshold (T) for 100 feet.

For example, using the above-noted approach of determining the depths of subterranean formation layer tops, the computer 124 determines that the depths associated with lines 220, 222, 224, 226, and 228 are associated with subterranean formation layer tops because they satisfy all of this criteria. For example, each of these lines (lines 220, 222, 224, 226, and 228) are associated with a depth ranges of $\Delta w_1$, $\Delta w_2$, $\Delta w_3$, $\Delta w_4$, and $\Delta w_5$, respectively, which all represent a depth range of at least 100 feet. In this particular example, the depth associated with line 222 represents a top of the Yamama formation layer and the depth associated with line 224 represents the top of the Sulay formation layer.

In some examples, the computer 124 rules out the first depth as an anomaly if the spectral amplitude has a zero amplitude (or approximately zero amplitude) above the determined depth. For example, the computer 124 determined that the depth associated with line 220 is an anomaly and removes this depth from the results because the depth spectrum of FIG. 5 show no substantial sound information above line 220. In some examples, no substantial sound information means that the acoustic sensors 102 began measuring sound at the depth associated with line 220.

While the predetermined threshold (T) of 0.0005 was used in this example, other threshold values can also be used. In some examples, the predetermined threshold (T) is predetermined to be between 0 and 0.015. In some examples, the predetermined threshold (T) is 0.005. While the predetermined depth range of 100 feet was used in this example, other predetermined depth ranges can also be used. In some examples, the predetermined depth range between 10 feet and 200 feet. In some examples, the predetermined depth range is 50 feet. In some examples, the predetermined depth range is 20 feet.

In some examples, the processor determines the depths of subterranean formation layer tops based on manual selection using a user interface. For example, the user interface 131 displays the depth spectrum and the engineer manually selects regions of the display that correspond to depths of subterranean formation layer tops.

In some examples, the processor determines the depths of subterranean formation layer tops based on comparing the determined one or more depths with well log data. For example, the computer 124 receives well log data from the database 125 and compares the depths of the subterranean formation layer tops with the well log data. In some examples, the computer 124 determines whether the depths of the subterranean formation layer tops are within a predetermined range of expected depths (for example, within 50 feet) based on the well log data. If the computer 124 determines that the depths of the subterranean formation layer tops are not within a predetermined range of expected depths based on the well log data, the computer 124 removes that particular depth from the results. In some examples, the predetermined range of expected depths is 100 feet, 200 ft, or 1000 feet.

In some examples, the processor determines the depths of subterranean formation layer tops based on comparing with a second depth spectrum generated using a second particular frequency of the second frequency range. For example, the computer 124 generates multiple depth spectrums based on other frequencies of the second frequency range. For example, frequencies of 250 Hz, 275 Hz, and 300 Hz. In such cases, the computer 124 determines whether each of these (or a majority of these) depth spectrums indicate the same depths of subterranean formation layer tops. If the computer 124 determines that the depths of the subterranean formation layer tops are commonly determined for each of (or a majority of) the depth spectrums for 250 Hz, 275 Hz, and 300 Hz, the computer 124 removes that particular depth from the results.

In some examples, the processor determines a control signal for one or more motors of a drill rig based on the determined depths of the subterranean formation layer tops while drilling the bore. For example, the computer 124 determines a control signal for the drilling motor 107 based on the depths of the subterranean formation layer tops. For example, the computer 124 determines a control signal that causes the drilling motor 107 to slow rotation, slow translation, stop rotation, stop translation, reverse rotation, and/or reverse translation. In some examples, the computer 124 transmits the control signal to the drilling motor 107 and the drilling motor 107 executes the instructions encoded within the control signal. For example, the drilling motor 107 stops the rotation and/or translation of the drill bit 104 to stop the drilling of the wellbore 118.

In some examples, the computer 124 determines a control signal that causes the drilling motor 107 to withdraw the drill bit 104 and drill stem 117 from the wellbore 118 to allow an engineer access into the wellbore 118 to install a casing (for example, casing 138). In some examples, the drill bit 104 automatically withdraws from the wellbore 118 as soon as a layer top is detected. For example, the drilling motor 107 causes the drill bit 104 to withdraw from the wellbore 118 based on determining the depth of a formation top of a particular layer (for example, the third layer 132C (depth D2) shown in FIG. 2).

In some examples, a casing is installed into the wellbore at one or more of the depths of the subterranean formation layer tops after stopping the drilling of the wellbore. For example, an engineer installs the casing 138 into the first two formation layers 132A-132B of the subterranean formation 132 based on determining the depth of the formation top of the third layer 132C (depth D2).

In some examples, the computer 124 controls the acoustic sensors 102 of the drill bit 104 to stop measuring sound when a particular formation is reached. In some examples, the computer 124 controls the acoustic sensors 102 of the drill bit 104 to stop measuring sound when a particular depth is reached.

Figure 6:
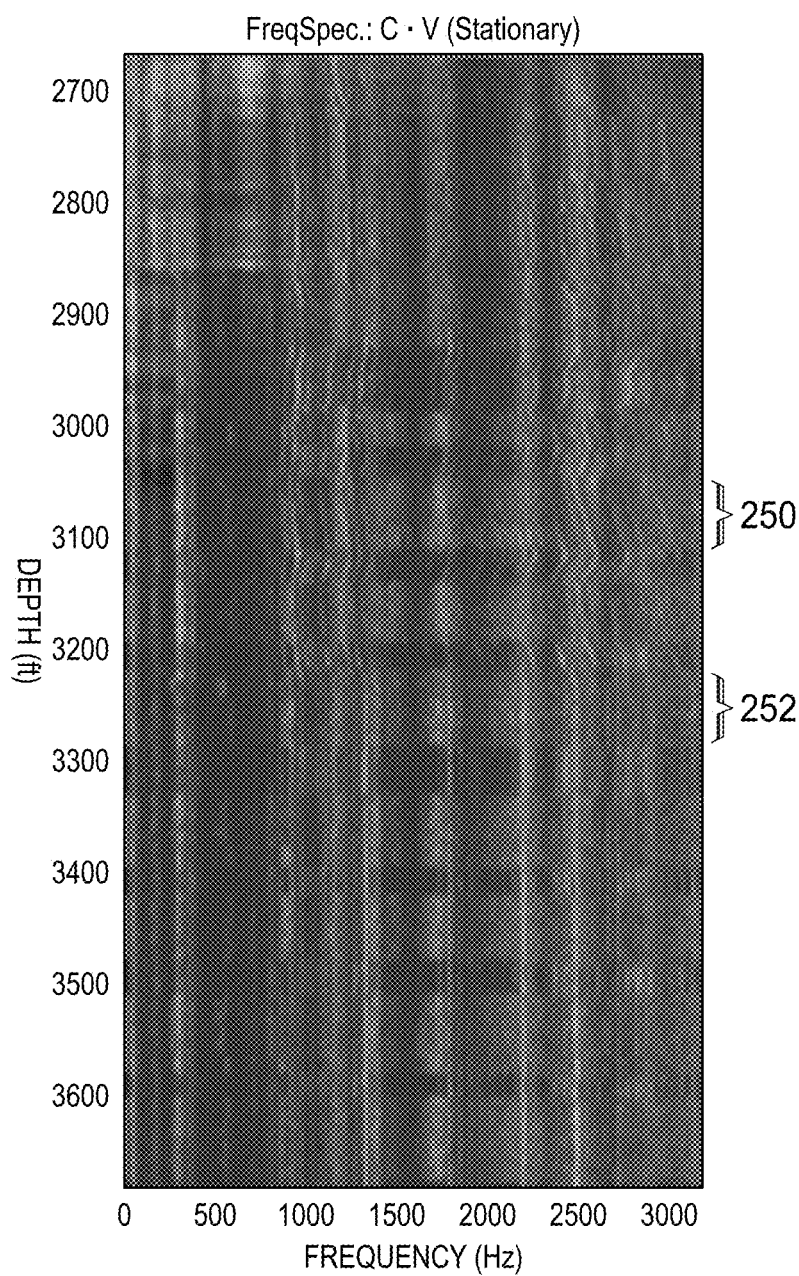
FIG. 6 is a spectrogram plot of measured sound within a wellbore as a function of depth within the wellbore and frequency of the measured sound.

FIG. 6 is a spectrogram plot of spectral amplitudes of the measured sound within the wellbore as a function of depth within the wellbore and frequency. In some examples, engineers use the spectrogram of FIG. 6 to aid in the identification of subterranean formation layer depths. For example, the subterranean formation associated with the Yamama formation spans the depth range 250 and the subterranean formation associated with the Sulay formation spans the depth range 252.

In some examples, the processor determines the depths of subterranean formation layer tops based on comparing the depths with a spectrogram plot. For example, the computer 124 generates a spectrogram plot and the engineer selects the depths of formation layer tops based on the generated spectrogram plot in addition to using the depth spectrum.

Figure 7:
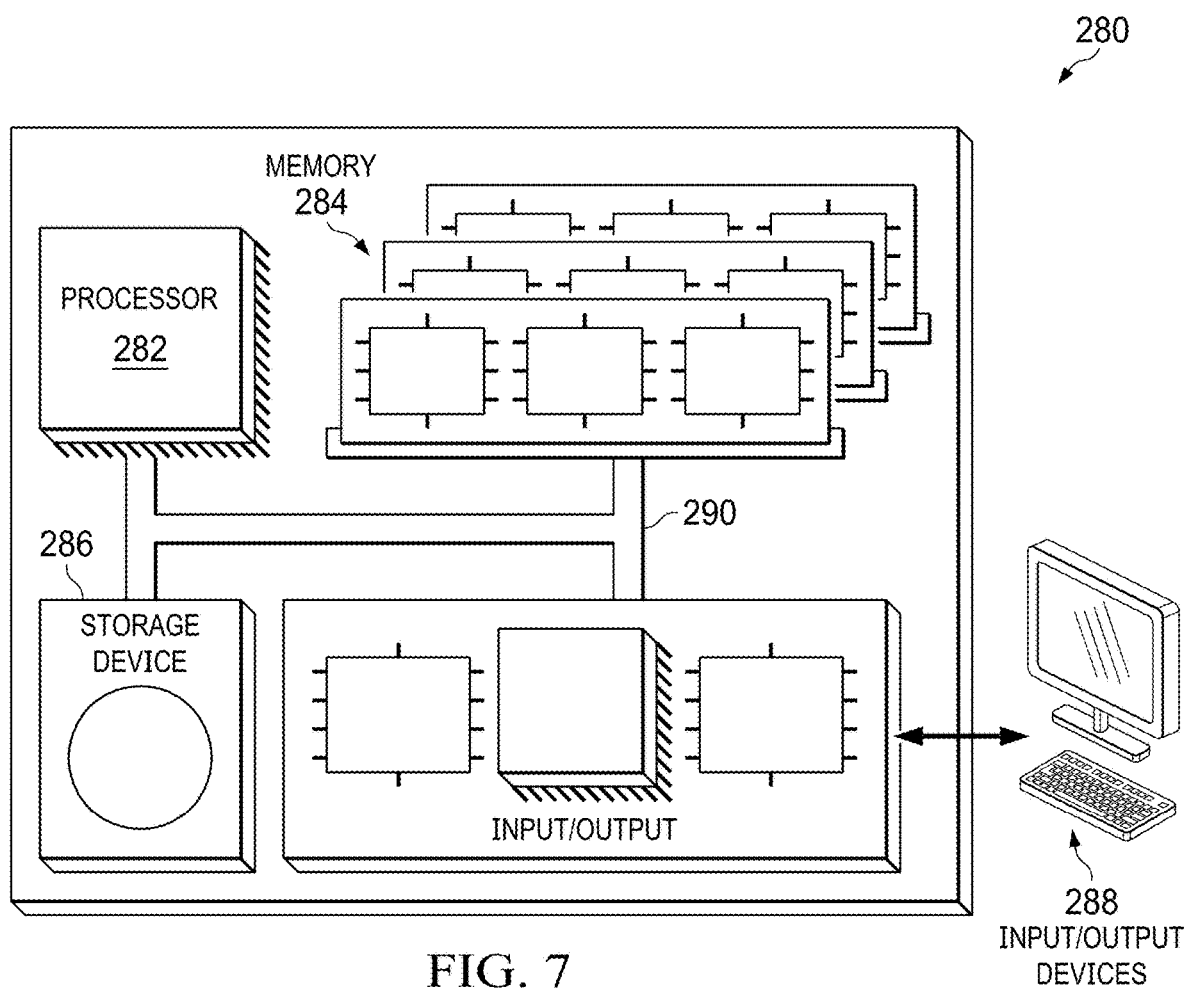
FIG. 7 is a block diagram of a computer system for a wellbore system.

FIG. 7 is a schematic illustration of an example computer 280 (or control system) for a wellbore system. In some examples, computer 280 is operable to determine depths of subterranean formation layer tops while drilling through a subterranean formation and control a drilling motor in response to the determined depths of the subterranean formation layer tops. In some examples, the computer 124 of the wellbore system 100 includes the computer 280.

The controller 280 is intended to include various forms of digital computers, such as printed circuit boards (PCB), processors, digital circuitry, or otherwise parts of a system for determining a subterranean formation breakdown pressure. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 280 includes a processor 282, a memory 284, a storage device 286, and an input/output device 288 (for example, displays, input devices, sensors, valves, pumps). Each of the components 282, 284, 286, and 288 are interconnected using a system bus 290. The processor 282 is capable of processing instructions for execution within the controller 280. The processor may be designed using any of a number of architectures. For example, the processor 282 may be a CISC (Complex Instruction Set Computers) processor, a RISC (Reduced Instruction Set Computer) processor, or a MISC (Minimal Instruction Set Computer) processor.

In one implementation, the processor 282 is a single-threaded processor. In another implementation, the processor 282 is a multi-threaded processor. The processor 282 is capable of processing instructions stored in the memory 284 or on the storage device 286 to display graphical information for a user interface on the input/output device 288.

The memory 284 stores information within the controller 280. In one implementation, the memory 284 is a computer-readable medium. In one implementation, the memory 284 is a volatile memory unit. In another implementation, the memory 284 is a non-volatile memory unit.

The storage device 286 is capable of providing mass storage for the controller 280. In one implementation, the storage device 286 is a computer-readable medium. In various different implementations, the storage device 286 may be a floppy disk device, a hard disk device, an optical disk device, or a tape device.

The input/output device 288 provides input/output operations for the controller 280. In one implementation, the input/output device 288 includes a keyboard and/or pointing device. In another implementation, the input/output device 288 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semi-conductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A system for determining depths of subterranean formation layer tops while drilling through the subterranean formation, the system comprising:
   a drill bit operable to drill a bore into one or more layers of subterranean formation;
   a drill rig comprising one or more drilling motors operable to control the depth and rotation of the drill bit into the subterranean formation;
   a microphone attached to the drill bit and operable to measure sound at a plurality of depths while drilling the bore;
   a depth sensor operable to measure a drill bit depth at the plurality of depths while drilling the bore; and
   a processor electrically connected to the microphone and the depth sensor, the processor operable to perform operations while drilling, the operations comprising:
      receiving, from the microphone, a sound signal representing sound measured at a plurality of depths within the bore;
      receiving, from the depth sensor, a depth signal representing the drill bit depth at the plurality of depths within the bore;
      normalizing the measured sound across the plurality of depths based on the sound signal and the depth signal;
      determining frequency spectrums of the normalized sound for one or more depths of the plurality of depths, each frequency spectrum representing spectral amplitude versus frequency;
      transforming the frequency spectrums into a single depth spectrum representing the spectral amplitude versus depth for a particular frequency between 100 Hz and 400 Hz;
      determining the depths of subterranean formation layer tops based on the depth spectrum;
      determining a control signal for the one or more drilling motors of the drill rig based on the determined one or more depths; and
      transmitting the control signal to the one or more drilling motors of the drill rig for controlling at least one of the depth and the rotation of the drill bit.

2. The system of claim 1, wherein the operations further comprise controlling the one or more drilling motors of the drill rig to stop the drilling of the bore based on the control signal.

3. The system of claim 1, further comprising one or more user interfaces operable to display the frequency spectrums and the depth spectrum, and receive a frequency range selection.

4. The system of claim 1, wherein the processor is located in a computer of the drill rig and one or more wires electrically connect the computer to the microphone, to the depth sensor, and to the one or more drilling motors of the drill rig.

5. The system of claim 1, wherein determining the depths of subterranean formation layer tops based on the depth spectrum comprises determining the depths associated with spectral amplitudes that change from below a predetermined threshold to above the predetermined threshold as a function of depth.

6. The system of claim 5, wherein determining the depths of subterranean formation layer tops based on the depth spectrum comprises determining the depths associated with spectral amplitudes that continue to maintain spectral amplitudes above the predetermined threshold for a predetermined depth range.

7. The system of claim 6, wherein the predetermined threshold is between 0 and 0.015 and the predetermined depth range is between 10 feet and 100 feet.

8. A method for determining depths of subterranean formation layer tops while drilling through the subterranean formation, the method comprising:
   drilling, by a drill bit, a bore through one or more layers of the subterranean formation; and
   while drilling the bore:
      measuring, by a microphone of the drill bit, a sound at a plurality of depths within the bore, the sound produced from an interaction of the drill bit and the subterranean formation;
      measuring, by a depth sensor of the drill bit, a drill bit depth at the plurality of depths within the bore;
      receiving, by a processor, a sound signal representing the measured sound and a depth signal representing the measured drill bit depth;
      normalizing, by the processor, the measured sound across the plurality of depths based on the received sound signal and the depth signal;
      determining, by the processor, frequency spectrums of the normalized sound for one or more depths of the plurality of depths, each frequency spectrum representing spectral amplitude versus frequency;
      transforming, by the processor, the frequency spectrums into a single depth spectrum representing the spectral amplitude versus depth for a particular frequency between 100 Hz and 400 Hz;
      determining, by the processor, the depths of subterranean formation layer tops based on the depth spectrum;
      determining a control signal for one or more motors of a drill rig based on the determined one or more depths; and
      controlling, by the one or more motors of the drill rig, at least one of a depth and a rotation of the drill bit based on the control signal.

9. The method of claim 8, wherein determining the depths of subterranean formation layer tops based on the depth spectrum comprises determining the depths associated with spectral amplitudes changing from below a predetermined threshold to above the predetermined threshold as a function of depth.

10. The method of claim 9, wherein determining the depths of subterranean formation layer tops based on the depth spectrum comprises determining the depths associated with spectral amplitudes continuing to maintain spectral amplitudes above the predetermined threshold for a predetermined depth range.

11. The method of claim 10, wherein the predetermined threshold is between 0 and 0.015 and the predetermined depth range is 100 feet.

12. The method of claim 8, wherein determining the depths of subterranean formation layer tops based on the depth spectrum comprises selecting the depths from a user interface.

13. The method of claim 8, wherein determining the depths of subterranean formation layer tops based on the depth spectrum comprises comparing the depths with well log data.

14. The method of claim 8, wherein controlling at least one of the depth and the rotation of the drill bit comprises stopping the drilling of the bore.

15. The method of claim 14, further comprising installing a casing into the bore at the determined one or more depths of the subterranean formation layer tops after stopping the drilling of the bore.

16. A method for determining depths of subterranean formation layer tops while drilling through the subterranean formation, the method comprising:

drilling, by a drill bit, a bore through one or more layers of the subterranean formation; and while drilling the bore:

measuring, by a microphone of the drill bit, a sound at a plurality of depths within the bore, the sound produced from an interaction of the drill bit and the subterranean formation;

measuring, by a depth sensor of the drill bit, a drill bit depth at the plurality of depths within the bore;

receiving, by a processor, a sound signal representing the measured sound and a depth signal representing the measured drill bit depth;

normalizing, by the processor, the measured sound across the plurality of depths based on the received sound signal and the depth signal;

determining, by the processor, frequency spectrums of the normalized sound for one or more depths of the plurality of depths, each of the frequency spectrums representing spectral amplitude versus frequency;

displaying, by a user interface, at least two of the frequency spectrums;

in response to displaying the at least two frequency spectrums, selecting, by the user interface, a first frequency range between 0 Hz and 500 Hz;

in response to selecting the first frequency range, determining, by the processor, a second frequency range between 200 Hz and 400 Hz;

transforming, by the processor, the frequency spectrums into a single depth spectrum representing the spectral amplitude versus depth for a first particular frequency of the second frequency range;

displaying, by the user interface, the depth spectrum; and determining, by the processor, the depths of subterranean formation layer tops based on the depth spectrum;

determining, by the processor, a control signal for one or more motors of a drill rig based on the determined one or more depths; and controlling, by the one or more motors of the drill rig, at least one of a depth and a rotation of the drill bit based on the control signal.

17. The method of claim 16, wherein measuring the sound comprises measuring frequencies between 0 Hz and 3500 Hz and measuring the drill bit depth at the plurality of depths within the bore comprises measuring the drill bit depth at depths between 2000 feet and 4000 feet into the subterranean formation.

18. The method of claim 16, wherein determining the depths of subterranean formation layer tops based on the depth spectrum comprises comparing the depths with a second depth spectrum generated using a second particular frequency of the second frequency range.

* * * * *